US006546496B1

(12) United States Patent
Wang et al.

(10) Patent No.: US 6,546,496 B1
(45) Date of Patent: Apr. 8, 2003

(54) NETWORK INTERFACE WITH POWER CONSERVATION USING DYNAMIC CLOCK CONTROL

(75) Inventors: Chi-Lie Wang, Sunnyvale, CA (US); Li-Jau Yang, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/505,094

(22) Filed: Feb. 16, 2000

(51) Int. Cl.[7] .................................................. G06F 1/32
(52) U.S. Cl. ....................................................... 713/322
(58) Field of Search .................................. 713/320, 322

(56) References Cited

U.S. PATENT DOCUMENTS

| 5,206,857 | A | * | 4/1993 | Farleigh ...................... 370/452 |
| 5,761,431 | A | * | 6/1998 | Gross et al. ................. 709/225 |
| 5,809,223 | A | | 9/1998 | Lee et al. ............... 395/182.02 |
| 5,938,771 | A | | 8/1999 | Williams et al. ............ 713/310 |

OTHER PUBLICATIONS

LanQuest "*10/100 Mbps Fast Ethernet PCI Network Interface Card 100 Mbps Performance Benchmark Comparison*" Jan. 1998 consisting of 4 pages.
3Com "*Enhancing Enterprise Security*" Apr. 30, 1999 consisting of 10 pages.
3Com "*Fast EtherLink Server Network Interface Card*" 1999 consisting of 2 pages.
3Com "*3Com EtherLink 10/100 Mbps Desktop Network Interface Cards*" 1999 consisting of 2 pages.
3Com "*Introducing the 3CR990–TX–97 10/100 PCI NIC with 3XP Processor*" 1999 consisting of 4 pages.
3Com "*Fast EtherLink Server NIC (3C980–TX) Competitive Evaluation*" Sep. 29, 1998 consisting of 10 pages.

* cited by examiner

Primary Examiner—Thomas M. Heckler
(74) Attorney, Agent, or Firm—Mark A. Haynes; Haynes Beffel & Wolfeld LLP

(57) ABSTRACT

A system and method for managing power consumption on a network interface card involves connecting constantly running clocks to a small amount of logic on the network interface card. The logic is used to monitor activity on the network interface card, and in response to events enable the clocks for functional blocks within the chip, on an as needed basis. Through dynamically controlled clocks, power consumption can be reduced significantly, and the network interface card remains in a state that is able to react efficiently to external events related to transmission of packets, reception of packets and functions related to the management of the network interface.

30 Claims, 9 Drawing Sheets

NETWORK INTERFACE WITH POWER CONSERVATION USING DYNAMIC CLOCK CONTROL

BACKGROUND OF THE INVENTION

1. Field of the Invention

The present invention relates to computer networks and to interface devices for connecting host computers to networks. More particularly, the present invention relates to the conservation of power consumption by network interface cards in network connected systems based upon dynamic clock control.

2. Description of Related Art

Computer systems include network interfaces that support high speed data transfer between the host computer and the data network. These network interfaces are typically always on, because of the need to detect traffic on the connected networks, and to detect activity of the host computer which requires service of the network interface card. Thus, in systems for which power conservation is important, the network interface can consume significant power even when it is not downloading packets from the host, transmitting packets on the network, receiving packets from the network or uploading packets to the host.

Network interface cards usually include circuitry that is responsive to a number of different clocks, which are usually asynchronous. For example, a host bus clock, a network receive clock and a network transmit clock are necessary for interfacing with external communication paths. The interface card may also include an internal clock for a variety of logical functions. In order for the network interface to be in a condition to react to activity on its inputs, all of these clocks are left running in the circuitry. Thus, there are many signal transitions consuming power even when the interface card is in an idle state.

Accordingly, it is desirable to provide a network interface card that consumes less power, but remains ready to react efficiently to events on its inputs to transmit and receive data packets, and to react to other commands associated with management of the network interface.

SUMMARY OF THE INVENTION

The present invention provides a system and method for connecting constantly running clocks to a small amount of logic on the network interface card. The logic is used to monitor activity on the network interface card, and in response to events enable the clocks for functional blocks within the chip, on an as needed basis. Through dynamically controlled clocks, power consumption can be reduced significantly, and the network interface card remains in a state that is able to react efficiently to external events related to transmission of packets, reception of packets and functions related to the management of the network interface.

Accordingly, the present invention provides a method for managing power consumption on a network interface which manages transfer of data packets between a host processor operating in response to a host clock and a network operating in response to a network clock. The method includes monitoring activity on a first port coupled to the host processor and on a second port coupled to the network, and supplying the host clock and the network clock to circuitry in the network interface on an as needed basis, according to the activity on the first and second ports.

In embodiments in which the network interface includes transmit circuitry responsive to a transmit clock signal and receive circuitry responsive to a receive clock signal, the method includes supplying the transmit clock to circuitry in the transmit path circuitry in response to an event at the first port indicating the transmit sequence, and supplying the receive clock signal to circuitry in the receive path circuitry in response to an event at the second port indicating a receive sequence. The events at the first port indicating a transmit sequence are detected by decoding bus transactions using a decoder that receives a constantly running clock. The events at the second port indicating a receive sequence are detected by filtering packets received from network medium in circuitry which receives a constantly running clock, such as recovering the clock signal from the network.

Some embodiments include an interface between the host processor and a network interface card which comprises a bus operating in response to a bus clock, and the network interface card includes a bus master circuitry and bus slave circuitry. The bus clock is supplied to the bus slave circuitry in response to the detection of an event indicating a bus slave transaction. The bus clock is supplied to the bus master circuitry in response to the detection of an event indicating a bus master transaction.

In another aspect of the invention, for a network interface card including an internal clock, the internal clock is enabled in response to events on the input of the network interface card which can require the resources that rely on the internal clock. In for example, when the transmit circuitry includes a transmit first-in-first-out buffer that receives input data in response to the internal clock and, and supplies output data in response to the transmit clock, the internal clock is enabled in circuitry associated with the first-in-first-out buffer upon detection of events indicating a transmit sequence.

The present invention also provides a computer system which operates more efficiently, and consumes less power, that includes a network interface card with dynamically controlled clocks as described above. In addition, the present invention provides an integrated circuit for use in a network interface card including the logic resources and clock resources associated with dynamically controlled clocks for the functional blocks within the integrated circuit.

Thus, the present invention improves over the state-of-the-art by providing constantly running clocks only in small logic blocks which monitor host processor and network activities. The clocks on bus slave related logic are turned off when there are no bus transactions directed to the network interface. The clocks for the transmit packet buffer and the related download and transmit logic are turned off when there is no packet being downloaded or transmitted. Clocks to the receive packet buffer and the related receive/upload logic are turned off when there is no packet being received or uploaded. The clocks in the medium access controller MAC transmitter are turned off when there is no packet being transmitted to the network. The clocks in the MAC receiver are turned off when there is no packet being received. Overall, power consumption in the network interface card, and in the computer system employing the network interface card are reduced by the use of dynamically controlled clocks among the functional blocks of the network interface card.

Other aspects and advantages of the present invention can be seen upon review of the figures, the detailed description, and the claims which follow.

DETAILED DESCRIPTION

Figure 1:
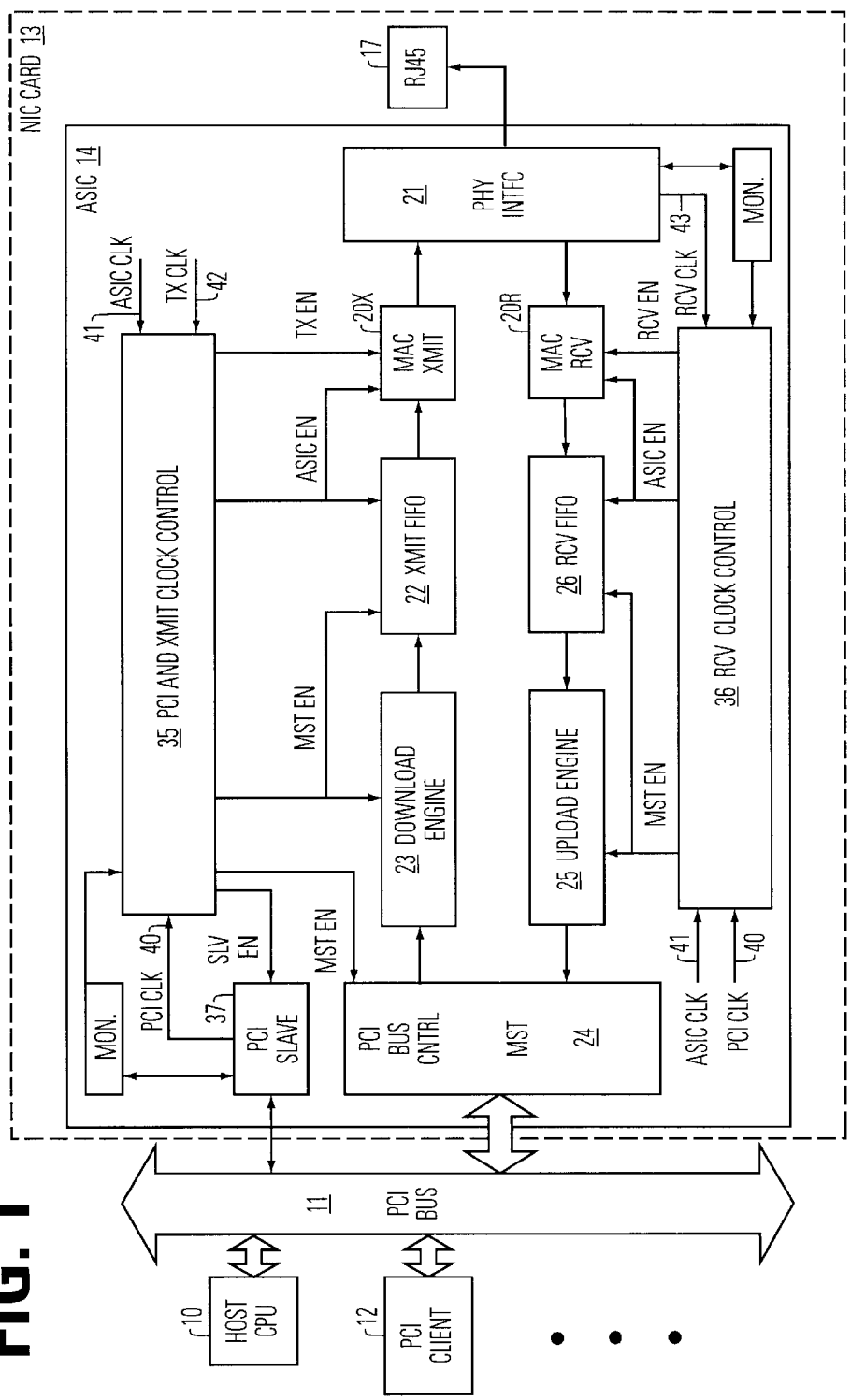
FIG. 1 is as simplified block diagram of a computer system including a network interface having reduced power consumption according to the present invention.

FIG. 1 provides a basic diagram of a computer system having a host CPU 10 coupled to a bus system 11, such as a PCI bus. The bus 11 interconnects a plurality of PCI clients, including client 12 and the network interface card 13 shown with expanded functional blocks. The network interface card 13 includes an application specific integrated circuit ASIC 14. The ASIC 14 includes network interface functions for an Ethernet interface in this embodiment. Other embodiments provide interfaces to other types of the network media. In addition to the ASIC 14, other components are interconnected by and supported by the circuit board of the network interface card 13. For example, a BIOS ROM (not shown), an EEPROM (not shown) and an RJ45 connector 17 are on the circuit board.

The ASIC 14 includes a MAC transmitter 20X for the transmit path and a MAC receiver 20R for the receive path coupled to media interface circuitry 21, which is coupled to the connector 17. The MAC transmitter 20X is also coupled to a transmit packet buffer 22 (usually a FIFO) which is driven by a download engine 23 on the ASIC 14. The download engine 23 is coupled to a PCI bus controller 24. The PCI bus controller 24 is also coupled to an upload engine 25. The upload engine 25 is coupled to a receive packet buffer 26 (usually a FIFO) which is connected to the MAC receiver 20R for the receive path. PCI slave circuitry 37 is coupled to the bus 11, and performs logic functions associated with operation of the network interface card 13. Thus, the illustration of the ASIC 14 includes basic elements of a network interface controller chip.

In addition, the ASIC 14 includes clock control circuitry 35, 36 which controls enabling of clock signals to the receive path circuitry, the transmit path circuitry, the PCI master circuitry 24 and the PCI slave circuitry 37. Network activity monitoring resources 30 coupled to the receive path clock control circuitry 36 are used for control of the enablement of the receive clock or clocks. PCI bus monitoring resources 31 which control enabling of the transmit clock or clocks are coupled to the PCI/transmit clock control circuits 35. The PCI bus monitoring resources 31 also control enabling the clocks for circuitry in the PCI bus controller, including the PCI slave circuits and master circuits.

In this example, the ASIC receives a raw PCI clock 40 from the host bus used for circuits synchronized with the host bus, a raw ASIC clock 41 from on chip clock circuits used for internal ASIC circuits like the receive FIFO input and the transmit FIFO output, a raw transmit clock 42 from on chip clock circuits used for clocking packets transmitted to the network from the transmit FIFO, and a raw receive clock 43 which is recovered from incoming frames at the network interface circuitry 21. The clock control circuitry 35, 36 produces enabled clock signals MS EN for the master PCI related circuits, SLV EN for the slave PCI related circuits, ASIC EN for the internal circuits, TX EN for the transmit related circuits, and RX EN for the receive related circuits. These clocks are distributed to the resources in the chip on an as needed basis, in response to the monitoring of bus and network activity. In this manner, resources on the chip which are not needed, do not consume power in idle states due to clock transitions. Other embodiments of the present invention will provide for more or fewer enabled clock signals, and receive more or fewer raw clock signals, depending the particular implementations and the level of granularity of control desired.

Figure 2:
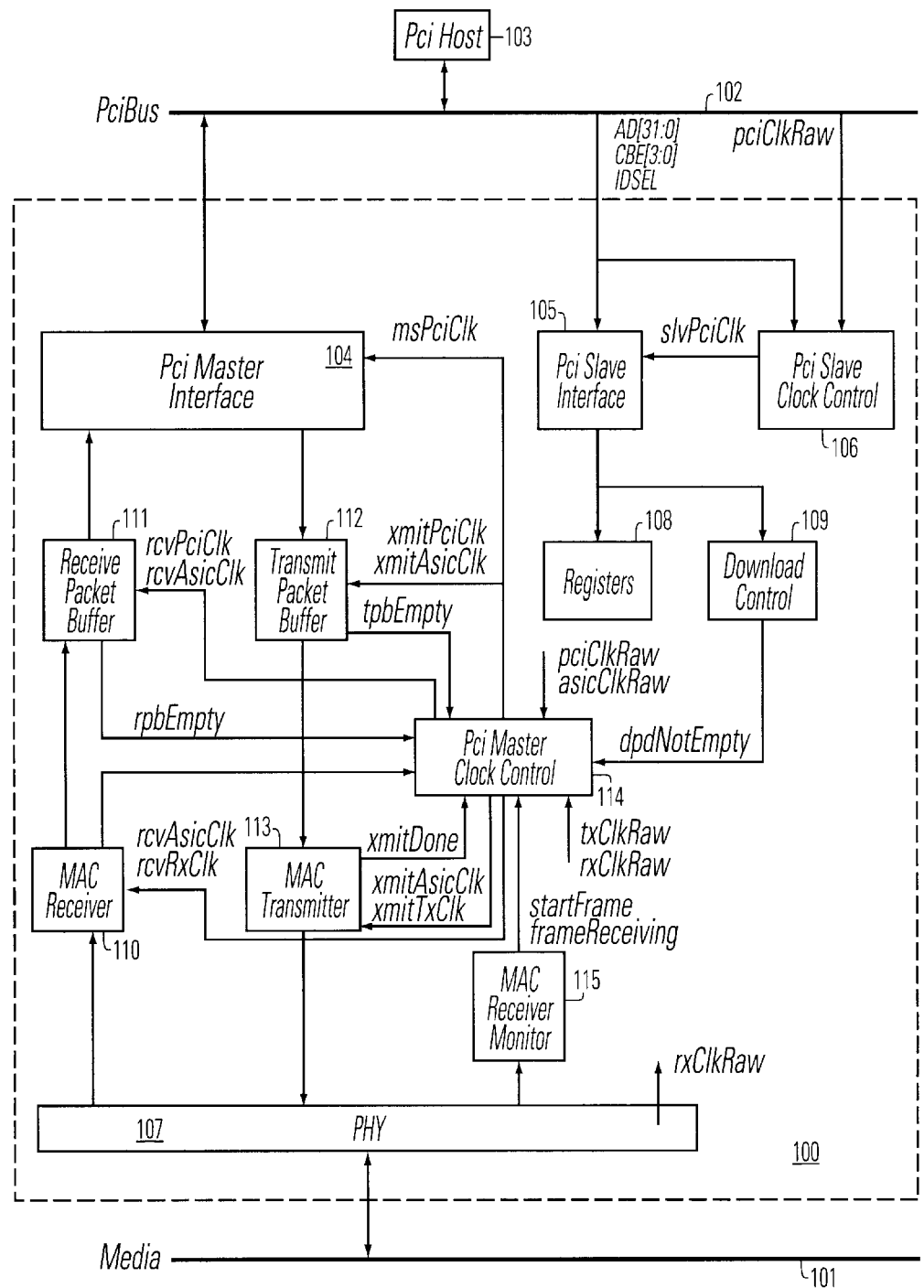
FIG. 2 is a more detailed block diagram of one embodiment of a network interface supporting power conservation according to the present invention.

FIG. 2 illustrates a more detailed diagram of one preferred embodiment of the present invention. In FIG. 2, a network interface card 100 is coupled to a network medium 101, such as an ethernet network operating at 100 Mbits, or 1 Giga-bits for example. A host processor 103 is coupled to a host bus 102, which in this example comprise a PCI host and a PCI bus.

The network interface card 100 includes a PCI master interface 104, a PCI slave interface 105, and a PCI slave clock control unit 106, all of which are coupled to the PCI bus 102. The PCI master interface 104 receives all of the signals on the PCI bus relevant to bus master operations. The PCI slave interface 105 receives the address signals, byte enable signals and other control signals such as IDSEL from the PCI bus 102. The PCI slave clock control unit 106, receives the PCI bus clock as well as other signals from the PCI bus 102.

The network interface card 100 includes a physical layer interface 107 for the particular network medium 101 in use. The physical layer interface 107 recovers a receive clock from the incoming data packets which is distributed within the chip as discussed in more detail below. A transmit clock generated on chip is used for transmitting network packets.

The functional blocks of the network interface card 100 can be characterized as receive path circuitry, transmit path circuitry, PCI slave circuitry, and PCI master circuitry. The PCI master circuitry is closely integrated with the receive path circuitry and transmit path circuitry.

The PCI slave circuitry includes the PCI slave interface 105, PCI slave clock control 106, a variety of on chip registers 108, and download control logic 109.

Receive path circuitry includes the physical interface 107, the MAC receiver circuitry 110, the receive packet buffer 111, and the PCI master interface 104.

Transmit path circuitry includes the PCI master interface 104, transmit packet buffer 112, MAC transmitter circuitry 113, and the physical layer interface 107.

The PCI master circuitry includes the PCI master interface 104, and the PCI master clock control circuit 114, which is coupled to the download control logic 109, and a MAC receiver monitor 115.

The network interface card 100 is used to connect various host devices to a network, providing communication paths for message passing or information access. On the transmit side, packets are downloaded from the bus to a transmit packet buffer 112. The packets are forwarded to the MAC transmitter 113, which converts in the packets to conform with the data link layer protocol (e.g. IEEE 802.3) of the particular network. These packets finally go through the physical layer interface 107 to be transmitted onto the wire or other medium. On the receive side, the packets being received from the wire, or other medium, go through the physical interface 107 and the MAC receiver 110 before being written into the receive packet buffer 111.

The PCI interface in this example consists of a PCI slave 105 and a PCI master 104. The PCI slave 105 operates to determine whether to accept a transaction initiated from the PCI host 103. These transactions are used for initializing registers 108 in the network interface card, checking status, handling interrupts and controlling data movement. The function of the PCI master 104 is to download packets from the PCI bus to be transmitted on the network, and upload packets to the PCI bus from the network.

In this embodiment, each packet can consist of multiple fragments which can reside in different chunks of host memory. Data downloading is initiated by fetching address and length information for each fragment, followed by downloading the fragments of packet data from the host memory to the transmit packet buffer 112. This process repeats until all the fragments within a packet and all the packets in the queue are downloaded. The data flow direction for uploading is reversed. After the packet has been received into the receive packet buffer 111, fragment address and length information is provided, and the data is uploaded into the allocated memory locations.

The clocks in the embodiment shown in FIG. 2 which are provided to the network interface card include the following:

pciClkRaw: This is the host bus clock which is provided to the PCI slave clock control 106, and the PCI master clock control 114. In this embodiment, the host bus clock is a 33 MHz constantly running clock.

asicClkRaw: This is an internal clock generated on the integrated circuit. In this embodiment, the internal clock is a 25 MHz constantly running clock.

txClkRaw: This is a 25 MHz constantly running transmit clock generated on the integrated circuit.

rxCLKRaw: This is the receive clock recovered at the physical interface 107, and constitutes a 25 MHz recovered network clock for a 100 Mb ethernet interface.

The PCI slave clock control unit 106 is responsive to signals on the PCI bus 102 to produce a slave PCI clock slvPciClk on the PCI slave interface 105 and related circuitry. This is described in more detail with respect to the FIGS. 3–6.

The PCI master clock control block 114 is responsive to a variety of signals indicating transmit and receive activity, including logic signal dpdNotEmpty from the download control logic 109 indicating that a download packet descriptor is not empty, a signal tpbEmpty from the transmit packet buffer 112 indicating that the transmit packet buffer is empty, a signal rpbEmpty from the receive packet buffer 111 indicating that the receive packet buffer is empty, a signal XmitDone from the MAC transmitter circuitry 113 indicating that the transmit of a particular packet is done, and signals startFrame, frameReceiving from the MAC receiver monitor 115 indicating a start frame sequence and a frame receiving sequence are occurring on the physical interface 107. The PCI master clock control block 114 is described in more detail below with reference to FIGS. 7–10, and operates to enable the host bus clock, the internal clock and the network clocks to circuitry within the transmit path circuitry, receive path circuitry and PCI master interface.

The clocks enabled by the PCI master clock control unit 114 on an as needed basis include the following:

msPciClk: This is the PCI clock for the PCI master interface 104.

rcvPciClk: This is the PCI clock for the receive packet buffer 111.

rcvAsicCLk: This is the internal clock for the receive packet buffer 111 and the MAC receiver 110.

rcvRxClk: This is the network receive clock for the MAC receiver 110.

xmitPciClk: This is the PCI clock for the transmit packet buffer 112.

xmitAsicClk: This is the internal clock for the transmit packet buffer 112 and MAC transmitter 113.

xmitTxClk: This is the network transmit clock for the MAC transmitter 113.

Figure 3:
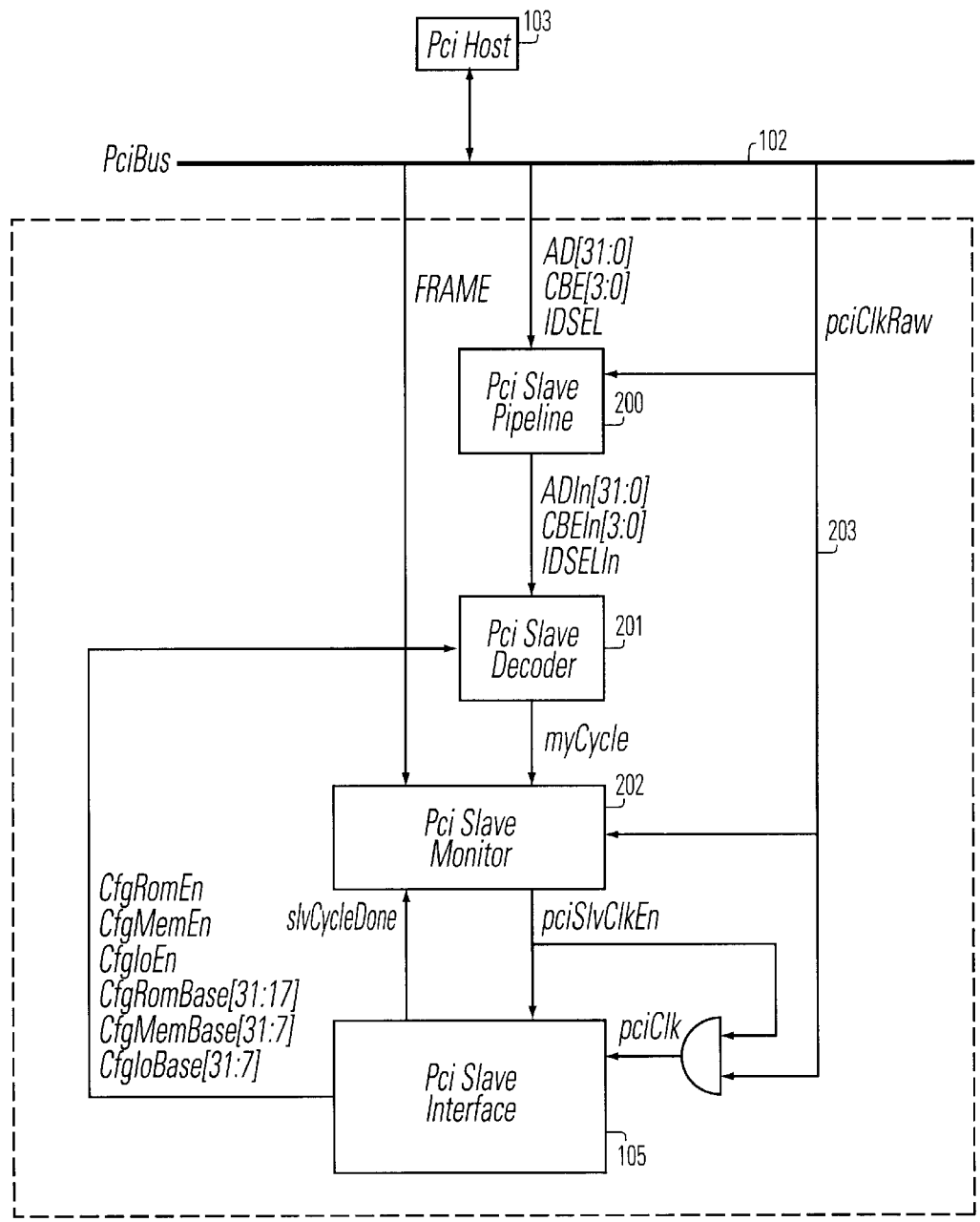
FIG. 3 is a more detailed functional block diagram of PCI slave circuitry and monitor logic for use in the system of FIG. 2.

FIG. 3 illustrates the PCI slave clock control block of FIG. 2. The PCI slave clock control block consists of circuitry including a PCI slave pipeline 200, a PCI slave decoder 201, and a PCI slave monitor 202. This circuitry is used to control enabling the clocks to PCI slave function blocks in the network interface card upon detecting an access to the network interface card requiring slave functions. The clocks remain enabled until access is completed. If no new access is detected at that time, clocks are disabled to save power.

Inputs to the circuitry of FIG. 3 include the FRAME signal, the address signals, the byte enable signals and the control signal IDSEL from the PCI bus 102 in this embodiment. Also, the bus clock is received by the circuit. The PCI slave pipeline 200 latches the address, byte enable and IDSEL signals, and provides them as input to the PCI slave decoder 201. The PCI slave decoder 201 determines whether an event has occurred on the bus which is relevant to the slave circuitry, and asserts a control signal to the PCI slave monitor 202. The PCI slave monitor 202 receives the FRAME signal as well as the output of the PCI slave decoder 201, and in response generates a clock enable signal for the PCI slave circuitry. The clock enable signal is supplied to a clock enable circuit, such as AND-gate 204, which also receives the bus clock has input. The output of the clock enable circuit is supplied as the PCI clock for the slave interface circuitry 105. The slave interface circuitry 105 asserts a signal indicating the end of the slave cycle, for use by the PCI slave monitor 202. Also, the PCI slave interface supplies register values which are used by the PCI slave decoder 201.

The values which are supplied to the PCI slave decoder 201 in this example include the following:

CfgRomEn: This is a parameter indicating access to the BIOS ROM is enabled.

CfgMemEn: This is a parameter indicating access to memory space registers in the network interface card is enabled.

CfgIoEn: This is a parameter indicating that I/O register space access is enabled.

CfgRomBase[31:17]: This is the base address for the BIOS ROM.

CfgMemBase[31:7]: This is the base address for the accessible memory space registers on the network interface card.

CfgIoBase[31:7]: This is the base address for the I/O space registers on the network interaface card.

Figure 4:
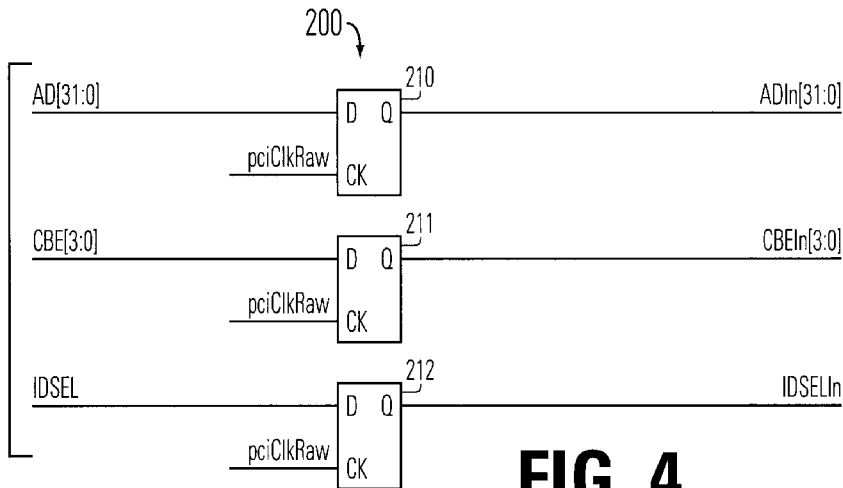
FIG. 4 is a logic diagram of the PCI slave pipeline of FIG. 3.

FIG. 4 illustrates the PCI slave pipeline 200. It includes a plurality of registers, including a first register set 210 for the address bits AD[31:0], a second register set 211 for the byte enable signals CBE[3:0], and a third register set 212 for the control signal IDSEL. The registers in the plurality of registers are clocked by the raw host bus clock pciClkRaw, and are therefore always running. The outputs of the registers are supplied as inputs to the PCI slave decoder 201.

Figure 5:
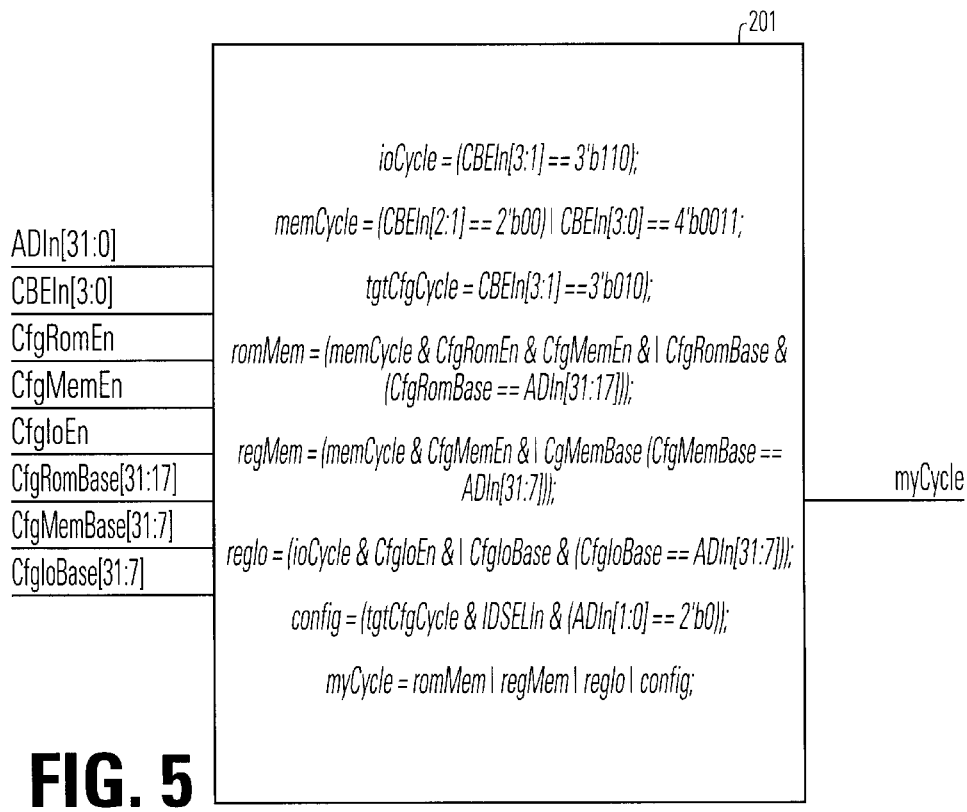
FIG. 5 is an illustration of the PCI slave decoder in the system of FIG. 3.

FIG. 5 illustrates the logic of the PCI slave decoder. Basically, the cycles are identified as I/O cycles, memory cycles or configuration cycles in response to the byte enable signals. The memory cycles are classified as ROM memory cycles or register memory cycles, as I/O cycles or as configuration cycles addressed to the particular network interface card in response to matching of the base addresses, and the parameters enabling access to the respective memory areas, with the incoming address and other control signals on the bus. In response to recognition of any of these types of cycles addressed to the particular network interface card on which the decoder is found, a "my cycle" signal is issued for use by the PCI slave monitor 202.

Figure 6:
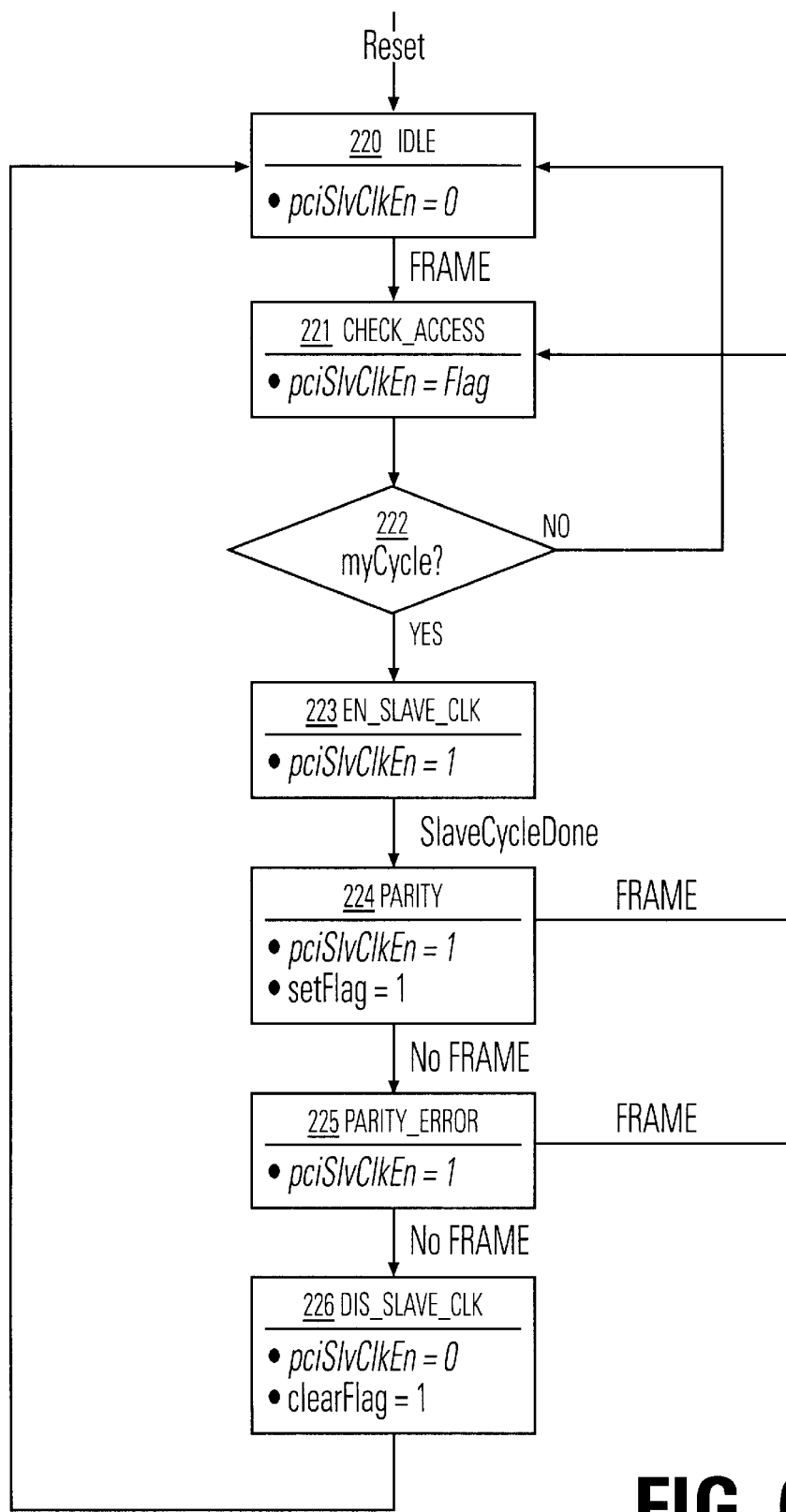
FIG. 6 is a flow chart illustrating operation of the PCI slave monitor of FIG. 3.

FIG. 6 illustrates the function of the PCI slave monitor 202. The slave monitor includes an idle state 220 in which the PCI slave clock enable signal is set at logic 0. When a frame is detected on the PCI bus, the logic transitions to a check access state 221. In the check access state 221, the PCI clock enable is set to value of a flag which is it set as described below. In the check access state 221, the presence of the "my cycle" signal is tested at block 222. If the "my cycle" signal is not detected, then the circuitry loops back to the idle state 220. If a "my cycle" signal is detected at block 222, then the logic transitions to an enable slave clock state 223. In this state, the PCI slave clock enable signal is set to logic 1. The circuitry remains in the enable slave clock state 223 until a slave cycle done signal is asserted by the PCI slave circuitry. On assertion of the slave cycle done signal, the circuitry transitions to a parity check state 224. The parity check state 224 keeps the clock enabled to allow parity checking to complete. In this state, the slave clock enable signal remains at logic 1, and the flag is set to logic 1. If during this state, a frame is detected, then the algorithm loops to the check access state 221. If a new frame is not detected in state 224, the algorithm proceeds to a parity error state 225 in which the PCI slave clock enable signal remains logic 1 allowing for the PCI slave circuitry to remain enabled for parity error detection. If the frame signal remains asserted that point, then the algorithm them loops to block 221. If at that point no frame signal is asserted, then the logic proceeds to the disable slave clock state 226. In this state, the PCI slave clock enable signal is set to logic 0, and a signal to clear the flag is set to logic 1 in order to clear the flag to a logic 0 state. At that point, the algorithm loops back to the idle state 220.

Figure 7:
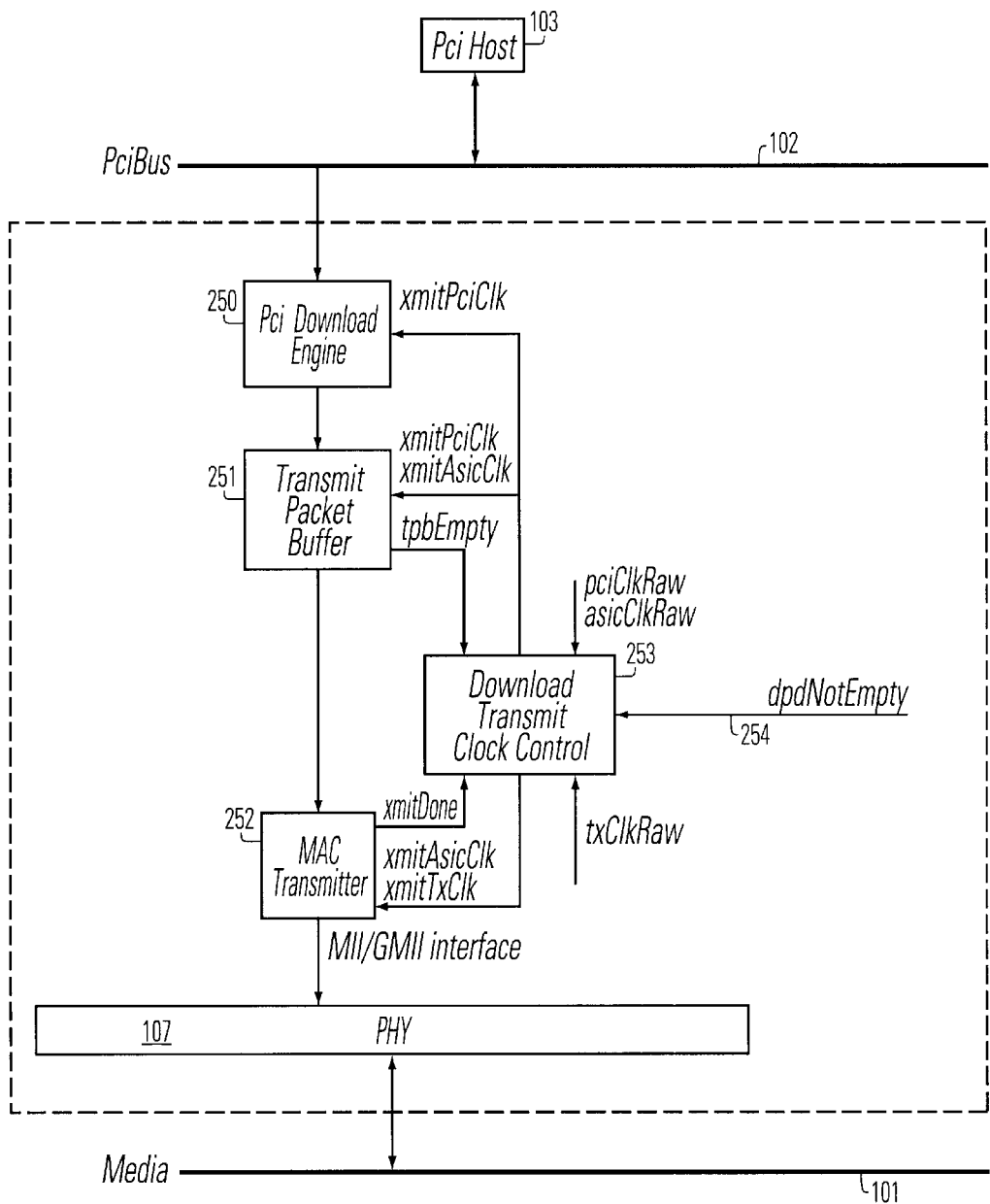
FIG. 7 is a more detailed functional block diagram of the transmit path circuitry in the network interface card.
Figure 8:
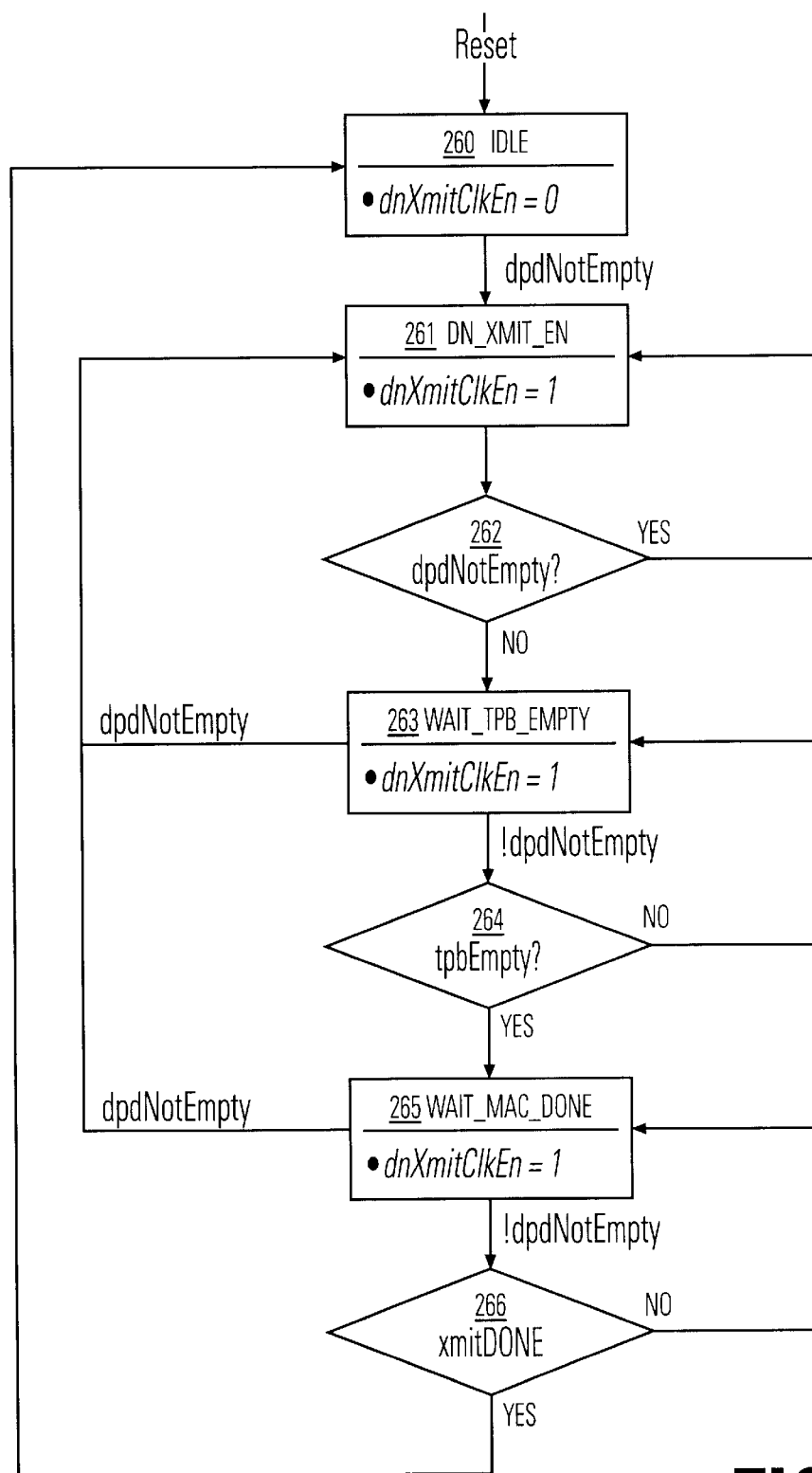
FIG. 8 is a flowchart of the operation of the download/transmit clock control block in the system of FIG. 7.
Figure 9:
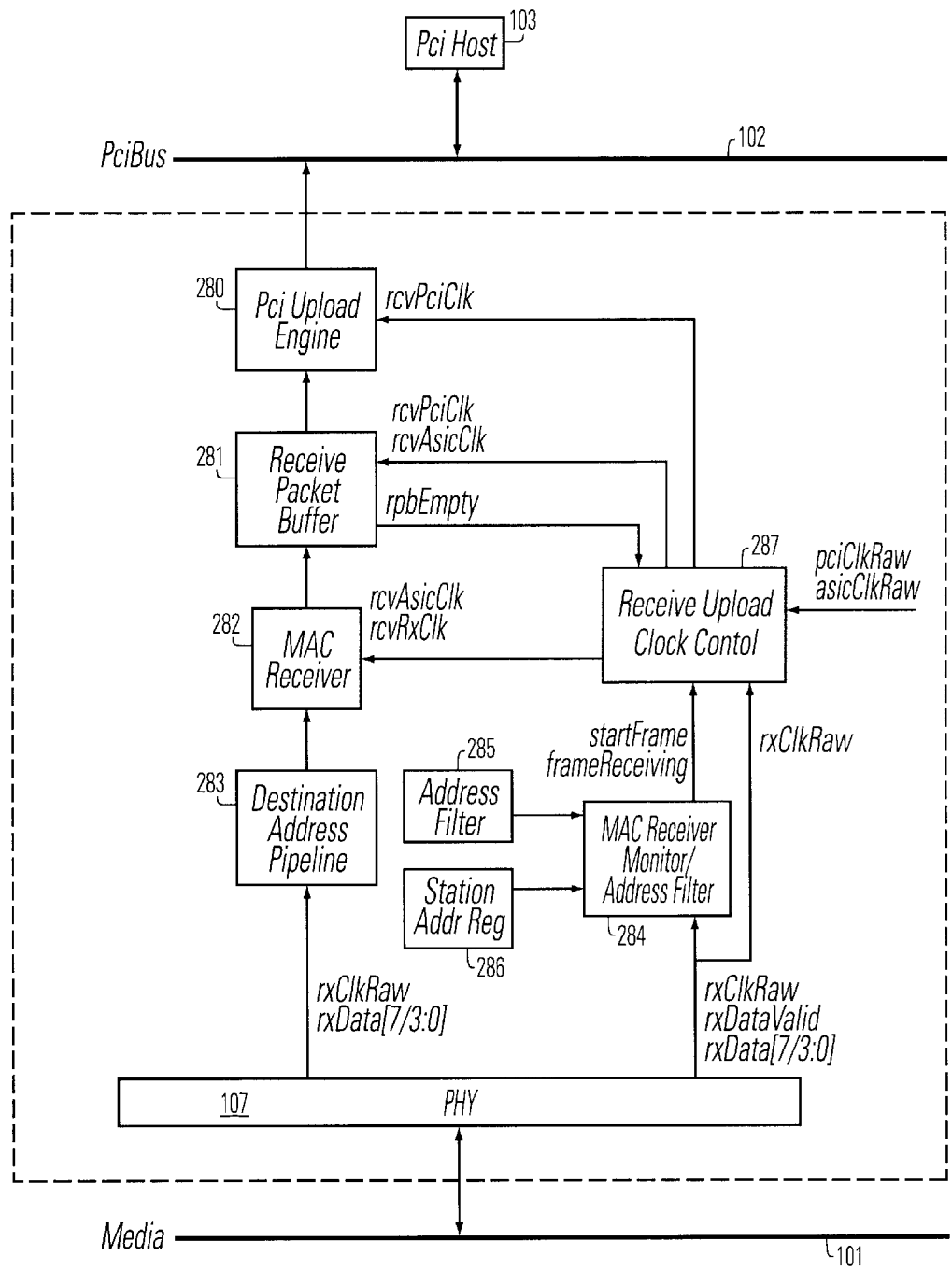
FIG. 9 is a more detailed functional block diagram of the receive path circuitry in the network interface card.
Figure 10:
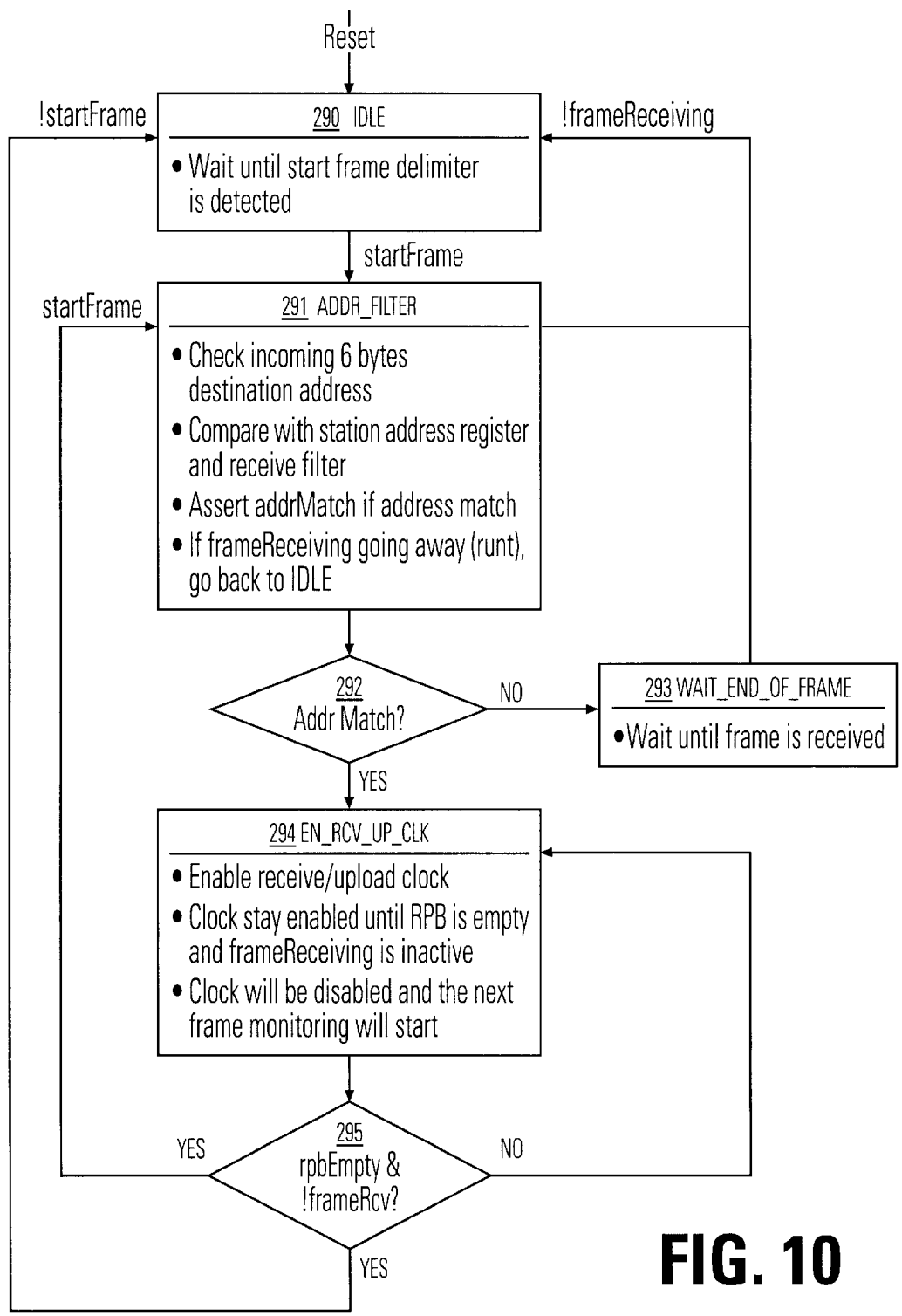
FIG. 10 is a flowchart of the operation of the receive/upload clock control block of FIG. 9.

The PCI master clock control 114 of FIG. 2, consists of three blocks in this example. A first block is for data transmit path circuitry as illustrated in FIGS. 7–8. A second block is for the data receive path circuitry as illustrated in FIGS. 9–10. The third block is for PCI bus arbitration and data transfer control. The clocks for each of the transmit path circuitry and the receive path circuitry are enabled if the corresponding block is active. The clocks for the PCI bus arbitration and data transfer control block are enabled if either of the first two blocks is active. Accordingly, no separate clock control logic is required for the PCI bus arbitration and data transfer control block.

FIG. 7 illustrates the clock control for the transmit path circuitry in the network interface card. The components shown in FIG. 7 include a PCI download engine 250, the transmit packet buffer 251, a MAC transmitter 252, and the physical layer interface 107. The PCI download engine 250 is coupled to the PCI bus 102. The physical layer interface 107 is coupled to the network medium 101. The download transmit clock control block 253 receives the raw PCI clock, the internal clock, and the raw transmit clock as inputs and supplies clocks to the download engine 250, the transmit buffer 251, and a MAC transmitter 252 in response to a signal dpdNot Empty on line 254 indicating that the download packet descriptor is not empty, indicating that there remain packets to be transmitted in a queue managed by the host, and in response to a signal tpbEmpty indicating that the transmit packet buffer 251 is empty. The clock signal names have been described above with respect FIG. 2.

FIG. 8 illustrates the operation of the download/transmit clock control unit. The control unit operation begins in an idle state 260. In this state, the download transmit clock enable signal is set to a logic 0. Upon reception of a dpdNotEmpty signal, the circuitry transitions to a download transmit enable state 261. In this state, the download transmit clock enable signal is set to a logic 1. The control signal dpdNotEmpty indicating whether the download packet descriptor is present is tested a block 262. If the signal is asserted indicating that a descriptor remains available, then the algorithm loops back to state 261. If in state 262, the control signal indicating presence of the download packet descriptor is not asserted, then the process proceeds to a wait until transmit packet buffer is empty state 263. In this state, the download transmit clock enable signal remains a logic 1. In this state, if the logic indicates that another download packet descriptor has been stored on the chip, then the process loops back to state 261. If the download packet descriptor signal indicates that no descriptors are available, then the signal tpdEmpty from the transmit packet buffer indicating that it is empty is tested. If the transmit packet buffer is not empty, then the process loops back to state 263. If the download packet buffer is empty, then the process proceeds to a wait until MAC done state 265. The download transmit clock enable signal remains a logic 1 in this state. If a new download packet descriptor is to available during this state, the process loops back to state 261. If not, then the process awaits assertion of the transmit done signal Xmit-Done by the MAC transmitter circuit as indicated by block 266. If the transmit done signal is not asserted, then the process loops back to state 265. If the transmit done signal is asserted before another download packet descriptor has been made available, then the process loops back to the idle state 260.

Thus, the transmit circuitry which includes the download from the host and transmit out on the network medium, operates in response to a download descriptor structure in host memory. The host driver sets up the download descriptor structure, and a control signal dpdNotEmpty is loaded into a DMA control register on the chip. Upon detecting his condition, the clocks for the PCI bus master download and transmit blocks are enabled. This path stays enabled until the signal dpdNotEmpty becomes false, indicating that all packets have been downloaded to the transmit packet buffer, and until the last byte is transmitted out of the MAC transmitter onto the network. At that point, clocks to the PCI master download block, transmit packet buffer and other circuitry associated with the transmit path are disabled.

FIG. 9 illustrates functional blocks of the receive path circuitry, including a PCI upload engine 280 coupled to the PCI bus 102, the receive packet buffer 281 coupled to the PCI upload engine 280, a MAC receiver 282 coupled to the receive packet buffer 281, and a destination address pipeline 283 coupled to the MAC receiver 282 and to the physical interface 107. A MAC receiver monitor and address filter block 284 is coupled to the physical interface 107. An address filter register 285 and a station address register 286 are coupled to the MAC receiver monitor and address filter 284. The receive upload clock control block 287 receives control signals from the MAC receiver monitor/address filter 284 and the raw receive clock which is recovered from the incoming packet data at the physical interface 107. The receive upload clock control block 287 also receives a control signal rpbEmpty from the receive packet buffer indicating whether it is empty. The receive upload clock control block 287 takes the host bus clock, the internal ASIC clock and the raw receive clock as inputs and provides internal clocks to various units of the receive path circuitry. The signals illustrated in FIG. 9 are discussed above with respect to FIG. 2. Exceptions include the destination address pipeline which receives the raw receive clock rxClkRaw and receive data rxData [7/3:0] from the physical interface 107, and the address filter components of the MAC receiver monitor which receive the raw receive clock rxClkRaw, the receive data valid signal rxDataValid and the receive packet data rxData [7/3:0] from the physical interface 107.

FIG. 10 illustrates the operation the receive/upload clock control block 287 and the MAC receiver monitor/address filter 284 of FIG. 9. The receive/upload clock control block logic begins in an idle state 290. In this state, it waits until a start frame delimiter is detected as indicated by the startFrame signal received from the MAC receiver monitor. Upon detection of the beginning of a frame, the process transitions to the address filter state 291. The address filter compares the incoming six bytes of the destination address with the station address filter 286 and receive address filter 285. An address match signal is asserted if a match is detected. If during this process the frameReceiving signal becomes logic 0, indicating a runt packet, the algorithm loops back to the idle state 290. Otherwise, an address match is awaited as indicated at block 292. If no match is detected, the process loops to the wait end of frame state 293, and remains in state 293 until the frameReceiving signal is de-asserted. If at block 292, an address match is detected, the process transitions to the enable receive and upload clock state 294. In this state, the receive and upload clocks are enabled and stay enabled until the receive packet buffer is empty and the frameReceiving signal is inactive. Thus, at block 292, the receive packet buffer signal and the frame receiving signals are monitored. As long as either the receive packet buffer is not empty or the frame receiving signal remains active, the process loops back to block 294. If the receive packet buffer is empty, and the frame receiving signal is not active, then the process either loops to the idle state 290 or to the address filter state 291, depending on the presence or not of a startFrame signal.

In operation, for control of the receive and upload clocks, receive packet data is constantly monitored, and a frame start signal is generated as soon as the start frame delimiter is detected. The signal is used to invoke address filter logic. If an end of frame condition signal is detected during an address comparison, a collision may have occurred. Control transfers back to the idle state in this case, to wait for the next start frame delimiter. Upon the completion of the destination address cycle, a total of six bytes, if there is no address match, clocks to the receive and upload path are not enabled. Instead, control goes back to the idle state to begin waiting for the next start frame delimiter. If an address match is detected indicating that the incoming frame should be received and uploaded, clocks for the receive and upload functional blocks in the receive path circuitry are enabled. At this point, the destination address pipeline register already has the destination address for the incoming packet, and the remainder of the packet including the source address, the type/length fields, and the frame data are loaded into the receive packet buffer and then uploaded to PCI memory. Clocks for the receive and upload circuitry stay enabled as long as the receive packet buffer is not empty, or the frame receiving signal is true. When the receive packet buffer becomes empty, and there is no active incoming frame, the clocks are disabled. In this event, control is transferred to the idle state so long as there is no start frame delimiter being detected. If the start frame delimiter is being detected at this time, the idle state is skipped, and the address filter state is entered directly.

In conclusion, the present invention provides a method and system that minimizes power consumption by network interface cards. Clocks are kept running on a very small amount of logic enabling the monitoring of activity on the network and on the host bus. Clocks for the functional blocks are enabled on an as needed basis depending on the type of activity detected. When the detected activity goes away, clocks are turned off. Using the advanced power management techniques of the present invention, overall quality is improved, and power budgets can be more easily met in advanced personal computer systems and other systems coupled to networks.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computer system, comprising:
    a host processor;
    a network interface having a first port coupled to the host processor and second port coupled to a network;
    transmit circuitry to transfer data packets from the first port to the second port operating in response to a transmit clock signal;
    receive circuitry to transfer data packets from the second port to the first port operating in response to a receive clock signal; and
    clock control logic coupled to the first port and to said transmit circuitry, which supplies the transmit clock signal to the transmit circuitry in response to an event at the first port indicating a packet transmission sequence, and supplies the receive clock to the receive circuitry in response to an event at the second port indicating a packet reception sequence.

2. The computer system of claim 1, wherein the first port operates in response to a host clock, and the clock control circuitry supplies the host clock to circuitry in the first port in response to an event indicating an input or output transaction between the host processor and the first port.

3. The computer system of claim 1, wherein the first port comprises a bus interface to a bus supplying a host bus clock, and operates in response to the host bus clock, and the clock control circuitry supplies the host bus clock to circuitry in the first port in response to an event indicating an input or output transaction between the host processor and the first port.

4. The computer system of claim 1, wherein the second port comprises circuitry which supplies data packets to a network medium and which operates in response to the transmit clock, and the clock control circuitry supplies the transmit clock to circuitry in the transmit circuitry port in response to an event indicating activity in the transmit circuitry.

5. The computer system of claim 1, wherein the second port comprises circuitry which receives data packets from a network medium and which operates in response to the receive clock, and the clock control circuitry supplies the receive clock to circuitry in the receive circuitry in response to an event indicating receive activity in the second port.

6. The computer system of claim 1, wherein the receive circuitry and the transmit circuitry each include circuitry responsive to an internal clock, and the clock control circuitry supplies the internal clock to circuitry in the receive circuitry in response to an event indicating activity in the receive circuitry and supplies the internal clock to the transmit circuitry in response to an event indicating activity in the transmit circuitry.

7. The computer system of claim 1, wherein the host processor includes a bus, and the first port comprises a bus interface, and including a decoder coupled to the bus which decodes bus transactions to detect events indicating transmit activity in the first port.

8. The computer system of claim 1, including a filter coupled to the second port which filters packets to detect events indicating receive activity in the second port.

9. The computer system of claim 1, wherein the receive circuitry includes a receive packet buffer, and including logic to monitor data in the receive packet buffer to detect events indicating a receive sequence.

10. The computer system of claim 1, wherein the host processor includes a host bus operating in response to a host bus clock, and the first port comprises bus master circuitry and bus slave circuitry, and the clock control circuitry supplies the host bus clock to the bus master circuitry in response to an event indicating a bus master transaction between the host processor and the bus master circuitry, and supplies the host bus clock to the bus slave circuitry in response to an event indicating a bus slave transaction between the host processor and the bus slave circuitry.

11. The computer system of claim 10, including a decoder coupled to the host bus which decodes bus transactions to detect events indicating a bus master transaction between the host bus and the bus master circuitry, and to detect events indicating a bus slave transaction between the host and the bus slave circuitry.

12. A method for managing power consumption in a network interface which manages transfer of data packets between a host processor operating in response to a host clock and a network operating in response to a network clock, comprising:
   monitoring activity on a first port coupled to the host processor and on a second port coupled to the network; and
   supplying the host clock and the network clock to circuitry in the network interface on an as needed basis, according to the activity on the first and second ports.

13. The method of claim 12, wherein the network interface includes packet buffer, and including monitoring data in the packet buffer to detect a need for supplying the host clock and the network clock.

14. The method of claim 12, wherein the first port comprises bus master circuitry and bus slave circuitry responsive to a host bus clock, and the host clock comprises the host bus clock, and including:
   supplying the host bus clock to the bus master circuitry in response to an event indicating a bus master transaction between the host and the bus master circuitry, and
   supplying the host bus clock to the bus slave circuitry in response to an event indicating a bus slave transaction between the host and the bus slave circuitry.

15. The method of claim 14, including decoding transactions on the bus interface to detect events indicating a bus master transaction, and to detect events indicating a bus slave transaction.

16. The method of claim 12, wherein the network interface includes transmit circuitry responsive to a transmit clock signal and receive circuitry responsive to a receive clock signal, and the network clock comprises at least one of the transmit clock signal and the receive clock signal, the method including:
   supplying the transmit clock signal to circuitry in the transmit circuitry in response to an event at the first port indicating a transmit sequence; and
   supplying the receive clock signal to circuitry in the receive circuitry in response to an event at the second port indicating a receive sequence.

17. The method of claim 16, wherein the receive circuitry and the transmit circuitry each include circuitry responsive to an internal clock, and including:
   supplying the internal clock to circuitry in the receive circuitry in response to an event indicating activity in the receive circuitry and supplying the internal clock to the transmit circuitry in response to an event indicating activity in the transmit circuitry.

18. The method of claim 16, wherein the first port comprises a bus interface, and including decoding transactions on the bus interface to detect events indicating a transmit sequence, and filtering packets on the network to detect events indicating a receive sequence.

19. The method of claim 16, wherein the network interface includes a parameter store for data indicating a data packets to be transmitted, and including reading data in the parameter store to detect events indicating a transmit sequence.

20. An integrated circuit for use in a network interface for a host processor, comprising:
   a first port adapted for connection to the host processor and a second port adapted for connection to a network;
   transmit circuitry to transfer data packets from the first port to the second port operating in response to a transmit clock signal;
   receive circuitry to transfer data packets from the second port to the first port operating in response to a receive clock signal; and
   clock control logic coupled to the first port and to said transmit circuitry, which supplies the transmit clock signal to the transmit circuitry in response to an event at the first port indicating a packet transmission sequence, and supplies the receive clock to the receive circuitry in response to an event at the second port indicating a packet reception sequence.

21. The integrated circuit of claim 20, wherein the first port operates in response to a host clock, and the clock control circuitry supplies the host clock to circuitry in the first port in response to an event indicating an input or output transaction between the host and the first port.

22. The integrated circuit of claim 20, wherein the first port comprises a bus interface to a bus supplying a host bus clock, and operates in response to the host bus clock, and the clock control circuitry supplies the host bus clock to circuitry in the first port in response to an event indicating an input or output transaction between the bus and the first port.

23. The integrated circuit of claim 20, wherein the second port comprises circuitry which supplies data packets to a network medium and which operates in response to the transmit clock.

24. The integrated circuit of claim 20, wherein the second port comprises circuitry which receives data packets from a network medium and which operates in response to the receive clock, and the clock control circuitry supplies the receive clock to circuitry in the receive circuitry in response to an event indicating receive activity in the second port.

25. The integrated circuit of claim 20, wherein the receive circuitry and the transmit circuitry each include circuitry responsive to an internal clock, and the clock control circuitry supplies the internal clock to circuitry in the receive circuitry in response to an event indicating activity in the receive circuitry and supplies the internal clock to the transmit circuitry in response to an event indicating activity in the transmit circuitry.

26. The integrated circuit of claim 20, wherein the host processor includes a bus, and the first port comprises a bus interface, and including a decoder coupled to the bus which decodes bus transactions to detect events indicating transmit activity in the first port.

27. The integrated circuit of claim 20, including a filter coupled to the second port which filters packets to detect events indicating receive activity in the second port.

28. The integrated circuit of claim 20, wherein the receive circuitry includes a receive packet buffer, and including logic to monitor data in the receive packet buffer to detect events indicating a receive sequence.

29. The integrated circuit of claim 20, wherein the host processor includes a host bus operating in response to a host bus clock, and the first port comprises bus master circuitry and bus slave circuitry, and the clock control circuitry supplies the host bus clock to the bus master circuitry in response to an event indicating a bus master transaction between the host bus and the bus master circuitry, and supplies the host bus clock to the bus slave circuitry in response to an event indicating a bus slave transaction between the host bus and the bus slave circuitry.

30. The integrated circuit of claim 29, including a decoder coupled to the host bus which decodes bus transactions to detect events indicating a bus master transaction between the host bus and the bus master circuitry, and to detect events indicating a bus slave transaction between the host bus and the bus slave circuitry.

* * * * *